United States Patent
Glowinski et al.

(10) Patent No.: US 9,478,152 B2
(45) Date of Patent: Oct. 25, 2016

(54) DEVICE FOR SHADING EXTRANEOUS LIGHT AND FOR CREATING DEFINED LIGHTING CONDITIONS ON A MONITOR

(75) Inventors: Arndt Glowinski, Aachen (DE); Ronald Post, Aachen (DE); Stephan Helling, Aachen (DE)

(73) Assignee: CADDON COLOR TECHNOLOGY GMBH (DE)

( * ) Notice: Subject to any disclaimer, the term of this patent is extended or adjusted under 35 U.S.C. 154(b) by 270 days.

(21) Appl. No.: 13/264,799

(22) PCT Filed: Apr. 12, 2010

(86) PCT No.: PCT/EP2010/002244
§ 371 (c)(1),
(2), (4) Date: Oct. 17, 2011

(87) PCT Pub. No.: WO2010/118846
PCT Pub. Date: Oct. 21, 2010

(65) Prior Publication Data
US 2012/0039074 A1    Feb. 16, 2012

(30) Foreign Application Priority Data
Apr. 17, 2009 (DE) .................. 10 2009 017 551

(51) Int. Cl.
| F21V 1/00 | (2006.01) |
| G09F 9/30 | (2006.01) |
| G06F 1/16 | (2006.01) |

(52) U.S. Cl.
CPC ............. *G09F 9/30* (2013.01); *G06F 1/1603* (2013.01)

(58) Field of Classification Search
CPC .................. G06F 1/1603; G06F 9/30
USPC .......... 362/125, 362, 458; 359/601–614
See application file for complete search history.

(56) References Cited

U.S. PATENT DOCUMENTS

| 2,123,361 | A | * | 7/1938 | Hollis | 362/125 |
| 4,403,216 | A | * | 9/1983 | Yokoi | 345/9 |
| 4,440,457 | A | * | 4/1984 | Fogelman | G07F 17/3216 312/223.3 |
| 4,668,026 | A | * | 5/1987 | Lapeyre | A47B 21/0073 108/60 |
| 4,700,793 | A | * | 10/1987 | Luchinger | G01G 21/286 177/181 |
| 4,784,468 | A | * | 11/1988 | Tierney | 359/601 |
| 5,200,859 | A | * | 4/1993 | Payner | G02B 17/023 348/E5.131 |
| 5,298,688 | A | * | 3/1994 | Luechinger | G01G 21/286 177/181 |
| 5,400,903 | A | * | 3/1995 | Cooley | 206/320 |
| 5,584,548 | A | * | 12/1996 | Miller | A47B 21/0314 312/235.3 |
| 5,813,914 | A | * | 9/1998 | McKay et al. | 463/46 |
| 5,954,408 | A | * | 9/1999 | Bogucki | A47B 21/00 248/371 |
| 6,115,238 | A | * | 9/2000 | von Gutfeld | 361/679.26 |
| 6,144,418 | A | * | 11/2000 | Kappel | G02B 27/027 348/834 |
| 6,152,567 | A | * | 11/2000 | LaForgia | G06F 1/1601 359/601 |
| 6,302,546 | B1 | * | 10/2001 | Kordiak | 359/608 |
| 6,459,425 | B1 | * | 10/2002 | Holub et al. | 345/207 |
| 6,597,873 | B2 | * | 7/2003 | Doi | G03B 11/045 359/612 |
| 6,619,814 | B1 | * | 9/2003 | Hamada et al. | 362/127 |
| 6,735,022 | B1 | * | 5/2004 | Solitt | 359/802 |

(Continued)

*Primary Examiner* — Peggy Neils
*Assistant Examiner* — Tsion Tumebo
(74) *Attorney, Agent, or Firm* — Hayes Soloway PC

(57) ABSTRACT

A device for screening of outside light from the view of a video monitor is described. The device is constructed such that it may be fully or partially deployed, allowing for various configurations. In the fully collapsed configuration, the invention permits the user to employ the monitor without the light blocking shades as well. In a preferred embodiment, the device additionally includes a light source for illuminating the surface of the monitor.

18 Claims, 8 Drawing Sheets

(56) References Cited

U.S. PATENT DOCUMENTS

| | | | |
|---|---|---|---|
| 6,839,227 B1* | 1/2005 | Correa | G06F 1/1603 248/457 |
| 6,980,259 B2* | 12/2005 | Strollo | H04N 7/142 348/836 |
| 7,304,839 B1* | 12/2007 | Burns | G06F 1/1603 108/38 |
| 2008/0062419 A1* | 3/2008 | Fejfar | 356/394 |

* cited by examiner

DEVICE FOR SHADING EXTRANEOUS LIGHT AND FOR CREATING DEFINED LIGHTING CONDITIONS ON A MONITOR

BACKGROUND OF THE INVENTION

The invention relates to a device for screening of outside light and for generating defined lighting conditions on a monitor and if necessary on a pattern, with screening elements consisting of two side walls, a shade and an upper part, further with a base plate and a device to prevent outside light from impinging back, and at least one light source for illuminating a monitor surface.

Light boxes are known that are used on a monitor to create defined lighting conditions and to screen the monitor surface against outside light. Essentially they consist of a rear wall, two side walls, an upper part, a base plate and a shade. The upper part along with the side walls and the shade screen the monitor against diffuse and/or non-defined light from the surroundings. In the following text they are summarized under the overall term screening elements. The base plate connects and stabilizes the other components and ensures a secure seating of the light box at a specific place, for example on a writing table surface. Additionally, still another or several different light sources are integrated in the light box which irradiate the monitor surface with a defined and known light spectrum.

These screening designs are needed primarily for color comparisons between color examples on the monitor surface and color patterns made for example of material. The monitor should be screened as much as possible from all sides against outside light, but on the other hand the visual field to the monitor surface should continue to be as free as possible.

With the previously known versions, the light box is inflexibly and rigidly positioned on the monitor. The view to the monitor is always subjected to tunnel-like limitations due to the screening elements that extend far forward, and therefore is suitable only as a color pattern location. However, the hardware of such a work station can also be used with no problems for normal office work. Therefore, it is desirable to configure such a work station flexibly to that effect, so that the screening can be removed flexibly and rapidly. In the following text, the use of such a work station is designated for customary office work with normal operations.

In addition, the light source required for color comparison may be very bright. This may likewise be perceived as a hindrance. If it is in fact switched off during normal operations, long warm-up times are required when it is switched back on again. Flexibility in use of such a work station is thereby severely limited. Thus, a work station equipped with a light box does not offer much comfort: a tunnel-like visual field, bright light; and is not able to be used flexibly, due to the long warm-up times for the light source.

Therefore the task of the invention is to make further improvements in already known light boxes so as to make possible an unimpaired view of the monitor surface and also flexible and comfortable usability of a work station equipped with a light box. With this, no limitations in flexibility should arise.

This problem is solved by the features of the independent patent claim. Advantageous further embodiments of the invention are the subjects of the dependent claims.

SUMMARY OF THE INVENTION

The inventors have recognized that it is possible to make flexible use of the light box by configuring the screening elements so that at least in part they are mobile. Especially this can be achieved by equipping the light box with a roller and/or rail system. For example, the screening elements of the light box can be moved at least in part rearwards, when the monitor is used for other tasks. Thus a free and unlimited view exists of the monitor surface, since the visual field is no longer subject to tunnel-like limitations due to the side walls, upper part and the shade. If necessary, the retracted elements of the light box can again be brought back into their original position, so that the monitor is again ensured to be screened. Also one can switch quickly and at will between a work situation with and without the monitor being screened. Additionally, at least the screening elements can be slid back so that the user no longer is disturbed by the possibly very bright light source placed between the shade and monitor.

In theory there are various versions of the roller and/or rail system. One very simple version consists in sliding the screening elements and—if present—the rear wall of the light box, thus the entire upper part, rearwards away over the monitor. For this, the side walls can be secured in a guide rail on the base plate and stabilized in their motion. It is true, though, that with this version a relatively large amount of space will be required in the area behind the monitor. But the table as a rule is not sufficiently wide for this.

As an alternative, the screening elements can be configured to have multiple parts and be able to telescope inside each other. Then also merely a front part of the screening elements, the shade with the front areas of the (in this case) side walls configured to have two parts and of the upper part, can be telescoped backwards. To bring the shade as close as possible in its collapsed position to the monitor, in addition the telescoped screening elements can be slid still further backwards. With this, the space which the collapsed light box needs is close to that of the light box when deployed. In normal operations these alternatives permit an unrestricted view of the monitor. With both versions, the light source is slid behind the monitor, since it is integrated into the front area of the screening elements. Thus it no longer is a hindrance to the user and can remain switched on, to avoid any warm-up times and consequently to make possible flexible use and quick changes.

In another version it is possible to configure the side walls partially or totally as a roller made from an opaque material, so that they can be rolled up in the area behind the monitor. Thus the upper part, the shade, the rear wall and the base plate form a fixed housing. Thus the view toward the monitor is not completely free, since the shade and the upper part remain stationary. If needed, the rollers can be unrolled entirely or possibly partially toward the front. Also a corresponding embodiment of the roller is possible in a vertical direction, so that it can be rolled up upwards or downwards. A rails system on the remainder of the housing can stabilize the roller and supply an opaque border, thus ensuring that the monitor is screened optimally.

Corresponding to these basic concepts, the inventors propose to improve a device for screening of outside light and for generating defined light conditions at a monitor and if necessary on a pattern, with screening elements consisting of two side walls, a shade and an upper part, additionally with a base plate and a device to prevent outside light from penetrating back in, and at least one light source for illuminating a monitor surface in such a way that the screening elements are configured to be at least partially mobile and the at least one light source is integrated in the front area of the screening elements so that it does not illuminate the monitor after the screening elements have been slid back.

The device for preventing outside light from penetrating back in can be implemented, consisting of a rear wall, and also of a light-proof seal between a monitor or a monitor frame and screening elements placed around it, while doing away with a rear wall. With this last embodiment version, care is taken to provide automatically for sufficient ventilation. It should also be noted in supplemental fashion that a combination of both these features lies within the scope of the invention.

In an advantageous embodiment of the invention-specific light box, the screening elements, thus the side walls, the shade and the upper part, as well as the rear wall, are embodied to be completely slidable. If there is no need to screen the monitor, these parts can be slid over the monitor rearwards. Then the view of the monitor is no longer impaired and is free without limitations, since all the screening parts are behind the monitor. Thus the work station can comfortably be used for traditional office tasks as well. It is true that with this embodiment, a disadvantage is the increased space requirements in the area behind the monitor, because the entire upper part with the side walls and the rear wall take up space there.

One alternative embodiment of the invention-specific light box makes provision that the screening elements, including the shade, are embodied in two parts. Then the front parts, the parts facing the user, can be slid with the shade rearwards to the rear parts. In contrast to the embodiment first described, no enormous space is needed behind the monitor, because the rear parts with the base plate remain unaltered, and thus the space required does not change. With both possibilities, the light source arrayed behind the shade is also slid rearwards, so that the monitor is no longer irradiated. Then it is no longer necessary to switch the light source on and off, thus avoiding long warm-up times. By this means, it is possible to make considerably more flexible use of a monitor equipped with such a light box.

A further advantageous embodiment of the invention-specific light box consists in having a C-shaped configuration of the side walls and the rear wall in horizontal cross section. Then, for normal operation, the side walls can be telescoped toward the rear part of the C arc, so that the visual field is free on the side. Here the upper part stays with the shade and the light source over the monitor, so that the visual field from above is still impaired.

In advantageous fashion, with the three embodiment examples described until now, the base plate can have a rails system, so that the side walls can be placed for guidance in these rails. Owing to this guidance, the work situation can be quickly and flexibly changed.

In another advantageous embodiment of the invention-specific light box, the side walls can at least in part be configured as a roller or in equivalent fashion as a blind, wherein the rollers can either be configured as either horizontal or vertical, and preferably consist of an opaque material. If necessary, these rollers can be rolled up over or behind the monitor, so that at least the side walls no longer limit the view of the monitor. What is disadvantageous with this solution is that the position of the upper part with the light source attached there is not changed. The upper part and the shade further impair the visual field, and the light source consequently can be a hindrance in normal operation. As an alternative, the lamps can be equipped with a screening shade beneath the lamps.

Corresponding to a further embodiment possibility for the invention-specific light box, the screening elements can be configured to be foldable. If the monitor does not need to be screened, the side walls as well as the upper part and the shade can be folded rearwards to the rear wall, so that they lie parallel to the rear wall. The visual field is then totally free. The light source is folded back with the upper part and no longer disturbs the user.

With all the embodiments presented, the connections between the individual components, and most of all between the upper part, the shade and the side walls or the rollers, should be opaque, so that it is possible to have complete screening without disturbing incident light. The inner sides of the shades or the base plate are optimally provided with a light-absorbing surface such as black velvet or a black paint, to avoid light reflections onto the inner side of the light box.

Additionally it is advantageous if at least one ventilation device, such as a fan in combination with multiple air slots in the rear wall, is integrated into the invention-specific light box. This makes possible ventilation of the air within the light box and most of all behind the monitor which heats up during operation. Additional heat that arises from the light source is also diverted out of the light box. In advantageous fashion, a switch can be attached for switching the at least one ventilation device on the light box on and off. Additionally, in the area of the ventilation device a light trap can be attached which prevents outside light from penetrating through the ventilation device.

The invention-specific light box can also advantageously have one or more switches for the at least one light source, so that the one or more light source can be specifically operated.

Additionally, it can be meaningful if the invention-specific light box has an unlocking device. By this means, the individual or multiple screening elements can be prevented from sliding back, rolling up or folding back, to avoid disturbances. At the same time, the components can also be secured for normal operation.

In an especially convenient version of the invention-specific light box, the mobile components can have an automatic drive such as an electrical drive. By activating a switch, the desired working situation can be produced.

BRIEF DESCRIPTION OF THE DRAWINGS

In what follows, the invention is described in greater detail using preferred embodiment examples, it being pointed out that only those elements essential for immediate understanding of the invention are shown.

Shown in particular are.

DETAILED DESCRIPTION OF THE INVENTION

Figure 1:
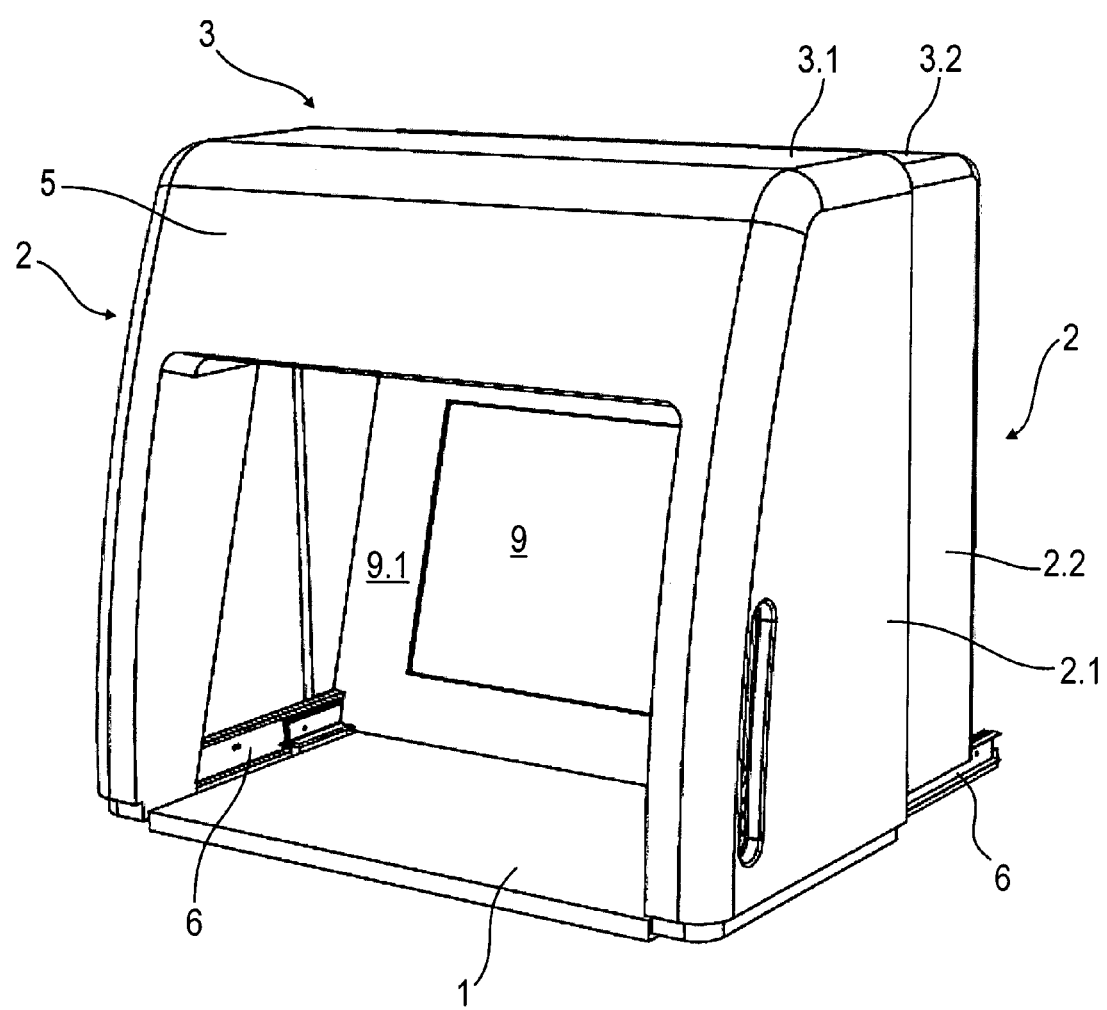
FIG. 1: A three-quarter view of a first embodiment example of a light box in its extended state

FIG. 1 shows a three-quarter view of the front of a first embodiment example of the invention-specific light box.

The overall light box essentially consists of the screening elements, comprising the side walls 2, the upper part 3 and the shade 5, the back wall not visible here, and the base plate 1. The screening elements, with the exception of the shade 5, are configured in two parts, each with a front part 2.1 and 3.1 and a rear part 2.2 and 3.2. The light box is seen here in its extended state. The monitor 9 in the interior of the light box, which is covered by a standardized monitor frame 9.1 outside the image surface and for example can be kept in a neutral gray, with as little reflecting surface as possible, is thus screened by the screening elements against outside light. In addition, in the interior there is a light source not visible here, which generates light with a defined known spectral composition and irradiates the monitor.

Owing to the screening of monitor 9, the user's visual field is severely limited in tunnel fashion. The shade 5 goes down as low as possible and the side walls 2 extent far to the front, to ensure good screening. For normal use of a monitor 9 equipped with a light box, this is very inconvenient. Additionally, the mostly very bright light of the light source is a disturbance.

The screening elements are configured to be interlocked with each other, and above all connected by connections that are as opaque as possible and placed on base plate 1, on which the monitor 9 also is positioned. This base plate 1 forms the base surface of the light box and serves for stable positioning. Additionally on its sides there are rails systems with rails, onto which the side walls 2 are placed so as to be slidable.

Figure 2:
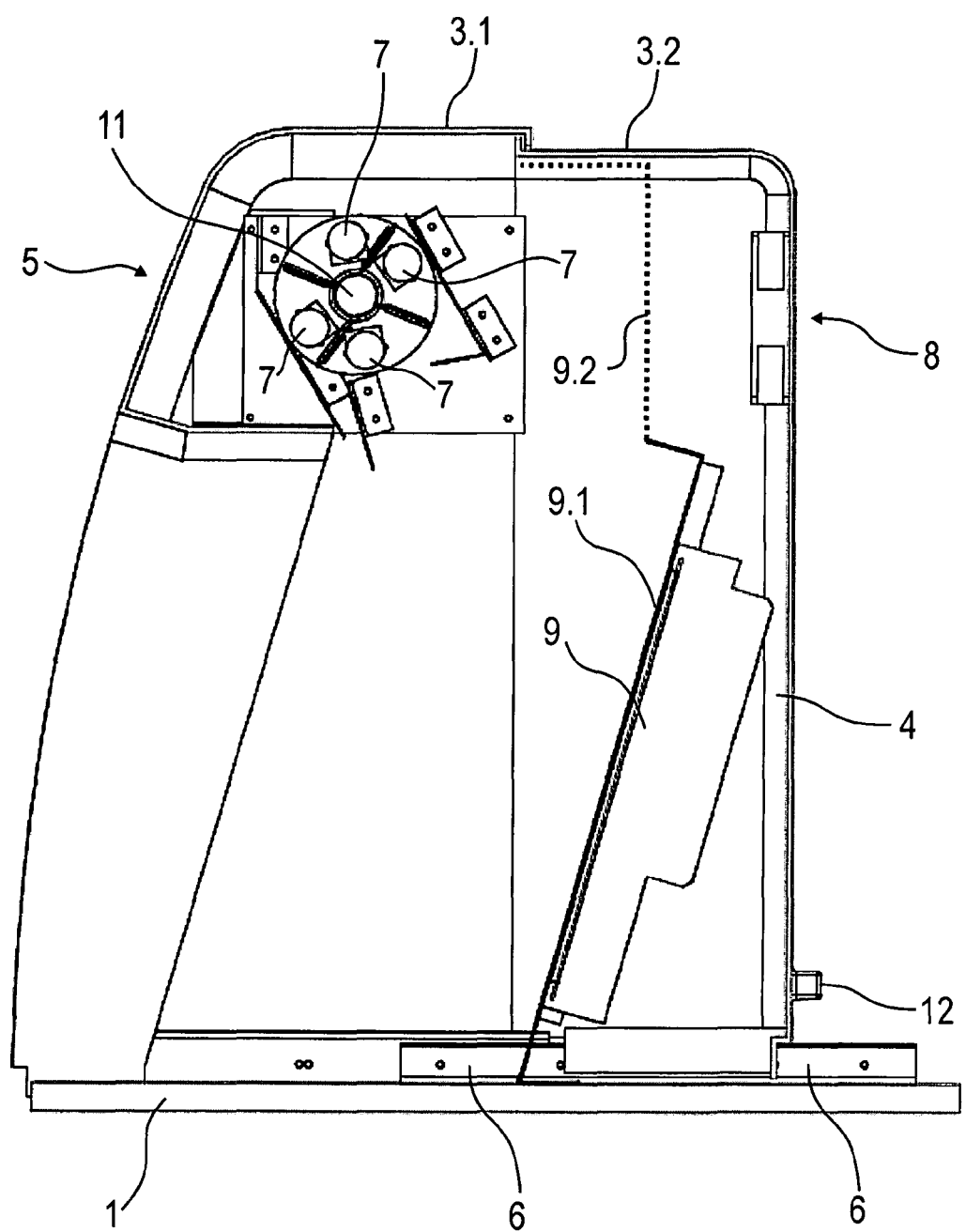
FIG. 2: A vertical cross section through FIG. 1

FIG. 2 shows a vertical cross section through the invention-specific light box from FIG. 1. Perceived especially well are the laterally placed rails 6 on base plate 1, in which the side walls are situated. Within the light box, directly behind shade 5 under the upper part, consisting of front and rear piece 3.1 and 3.2, are multiple fluorescent tubes 7. Here two fluorescent tubes 7 can be specifically chosen and brought into position with the aid of a turning device 11, to simultaneously irradiate monitor 9, including monitor frame 9.1 that surrounds its edges, with light in a specific wavelength range. Naturally the invention in principle is not limited to a total of four fluorescent tubes, of which two can be chosen for irradiation. The invention also comprises an arbitrary number of light sources that can be chosen individually or in groups.

In rear wall 4 there is a recess for a fan 8, which, when monitor 9 and fluorescent tubes 7 are operating, can expel the warmed air. Additionally, on the rear wall 4 there are spacers 12 which prevent the back side with fans 8 from being pushed too close to any wall that might be behind it. Additionally, it is pointed out that also here a light trap, not depicted in any greater detail, can be provided for fans, which prevents outside light from penetrating through the fans.

In this depiction, what is most clearly seen is the tunnel-like limitation of the visual field to monitor 9 and monitor frame 9.1 due to shade 5 which extends far downwards. It reaches down to the height of the upper edge of monitor frame 9.1 and additionally serves to cover the fluorescent tubes 7 toward the front.

In supplemental fashion, in FIG. 2 a light-proof seal 9.2 is also shown by dotted lines, which can be used in place of rear wall 4. This seal 9.2 can for example consist in a precisely fit extension of the monitor shade, which ensures through appropriate sealing surfaces or labyrinths that no outside light is incident from the rear side. With this it is advantageous that ventilation devices and forced-air devices are thus dispensed with, though in fact the overall impression is less attractive and it then becomes more difficult to clean the light box due to the highly irregular exterior.

Figure 3:
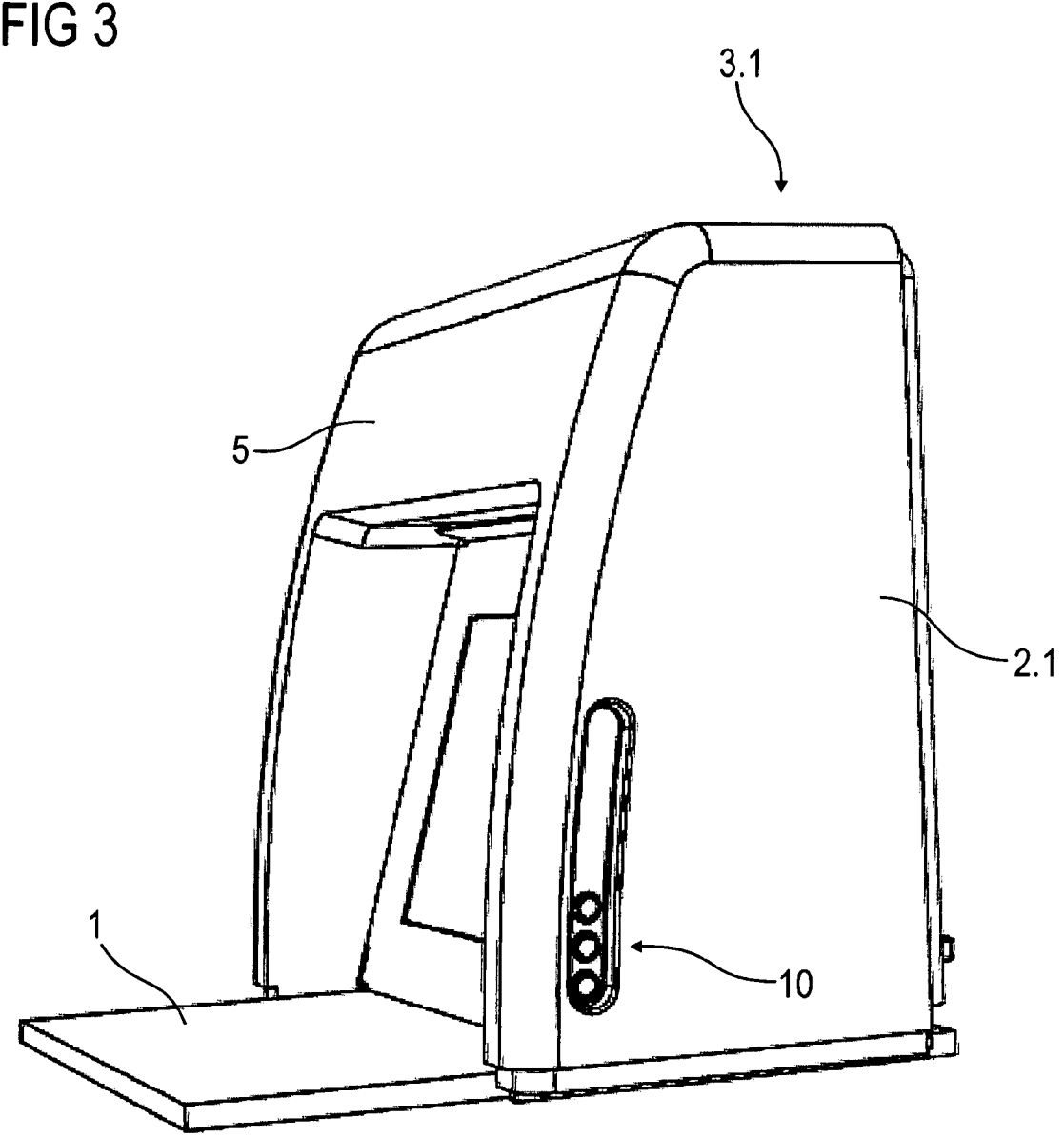
FIG. 3: Side view of a first embodiment example of a light box in its retracted state

FIG. 3 shows the invention-specific light box from FIGS. 1 and 2 with the screening elements retracted together. Here the front parts of side walls 2.1 and of the upper part 3.1 are moved together with shade 5 into the rear area above the monitor and above the rear parts of the side walls and of the upper part. With this, the light box is reduced to about half its length. The view of the monitor is free.

When sliding back, the front parts of the side walls 2.1 are fixed on the rails of base plate 1, so that the movement can be carried out in a controlled manner to prevent lateral slippage. Additionally, the side walls can be secured onto the rails with the aid of an unlocking device not visible here, to prevent unintended sliding forwards and backwards.

In the front area of the side wall facing the observer there is a recess for more switches 10, by which the various fluorescent tubes and the fan can be individually operated.

Figure 4:
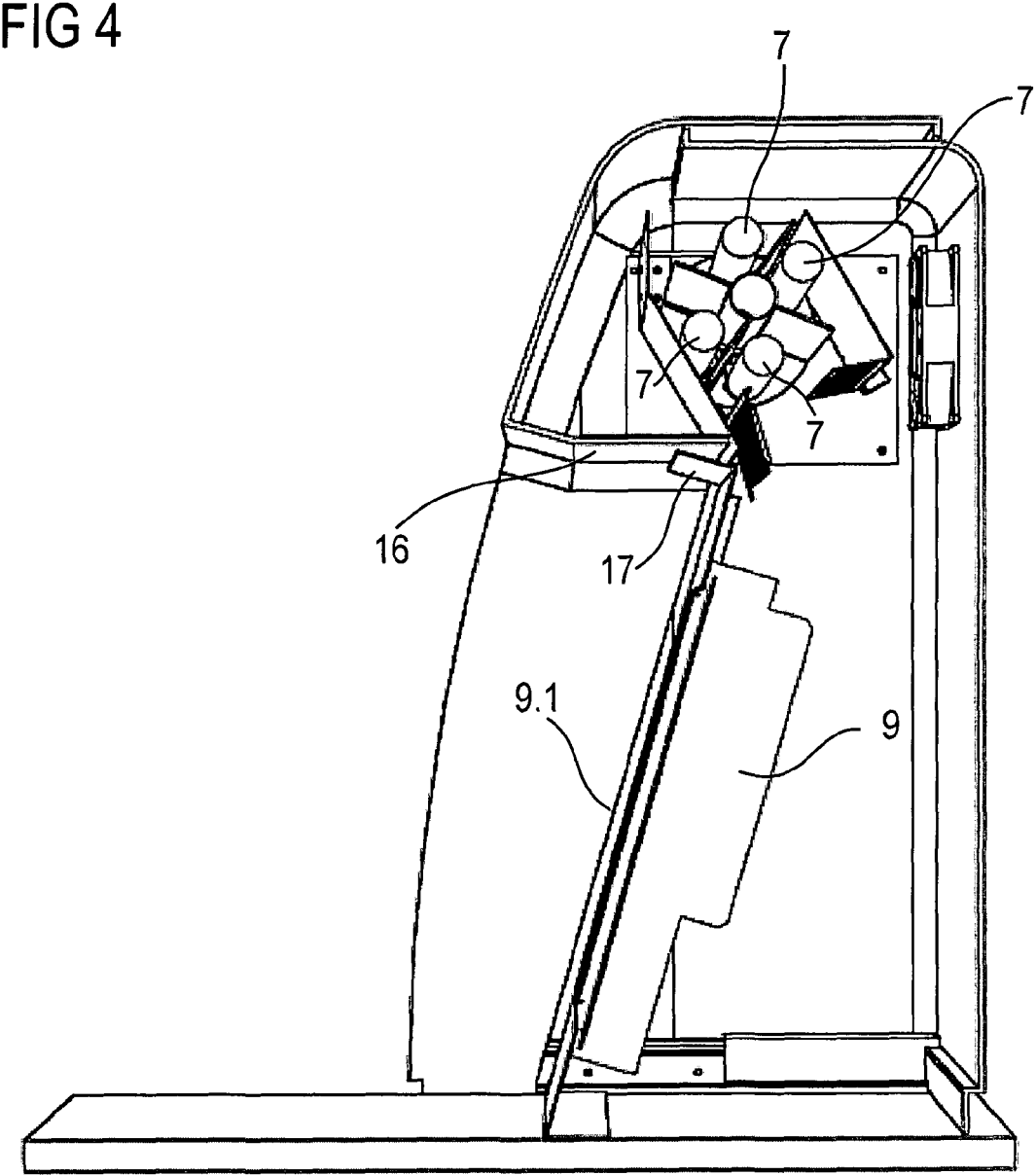
FIG. 4: A vertical cross section through FIG. 3

In FIG. 4 a vertical cross section through the retracted-together light box from FIG. 3 is seen. Here it can be perceived especially well that the luminescent tubes 7 no longer are irradiating monitor 9. They, together with the front part of the screening elements and the shade, are slid until they are behind monitor 9. In addition, monitor 9 is screened by an inner shade 16 and a monitor shading angle 17 in normal operation. Then, in normal operation, it is no longer necessary to switch the luminescent tubes 7 off. Primarily this is dealt with in the luminescent tubes 7 by a longer heating-up phase for greater flexibility in using the work space.

Figure 5:
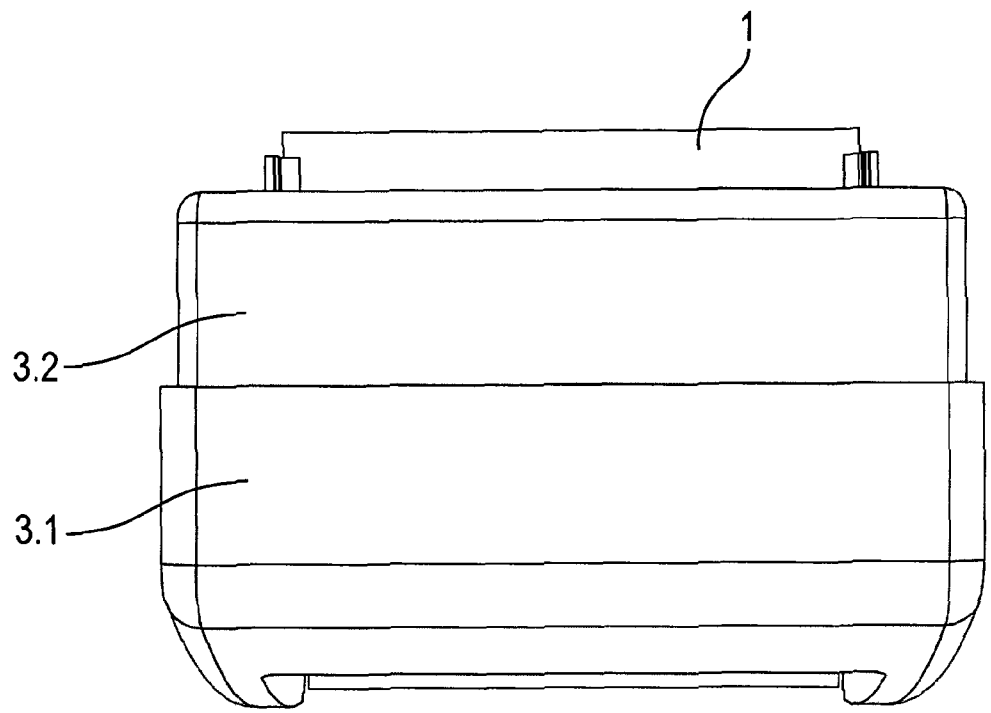
FIG. 5: Top-down view of a first embodiment example of a light box in its extended state as per FIG. 1
Figure 6:
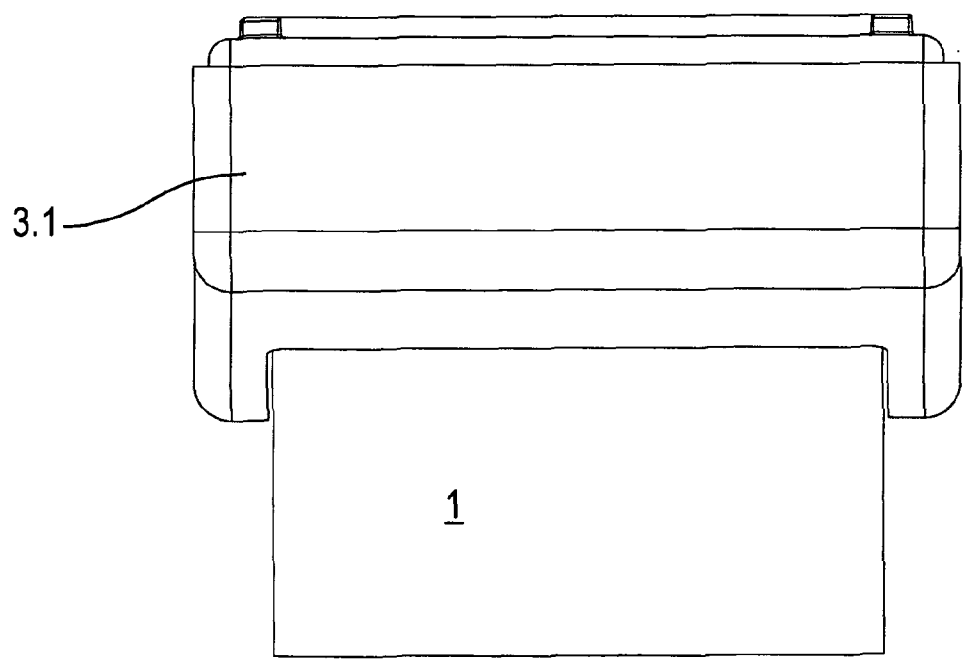
FIG. 6: Top-down view of a first embodiment example of a light box in its retracted state as per FIG. 3

FIGS. 5 and 6 show the previously-described light boxes from above; one in the extended state—see FIG. 5—and one in the retracted state—see FIG. 6. Most importantly, the upper part 3.1 and 3.2, embodied in two parts, is to be seen, as well as the base plate 1 in a retracted state.

Figure 7:
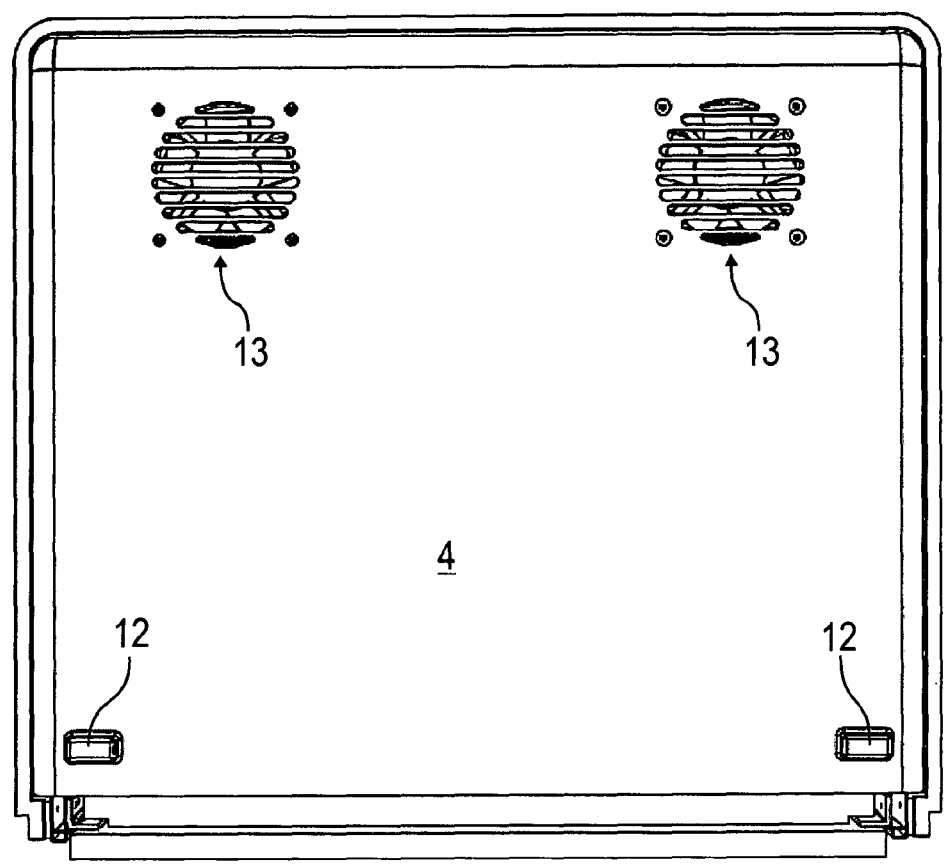
FIG. 7: Back view of a light box as per FIGS. 1 to 6

FIG. 7 shows the previously-described light box from the rear. In this embodiment, at the left and right in the upper part of the rear wall 4, are multiple air slits 13, behind which (thus in the interior of the light box) two fans are placed. With these fans, the air in the light box can circulate. In addition, in the lower area two spacers 12 can be perceived which prevent the light box from being shifted too close to a wall situated behind.

Figure 8:
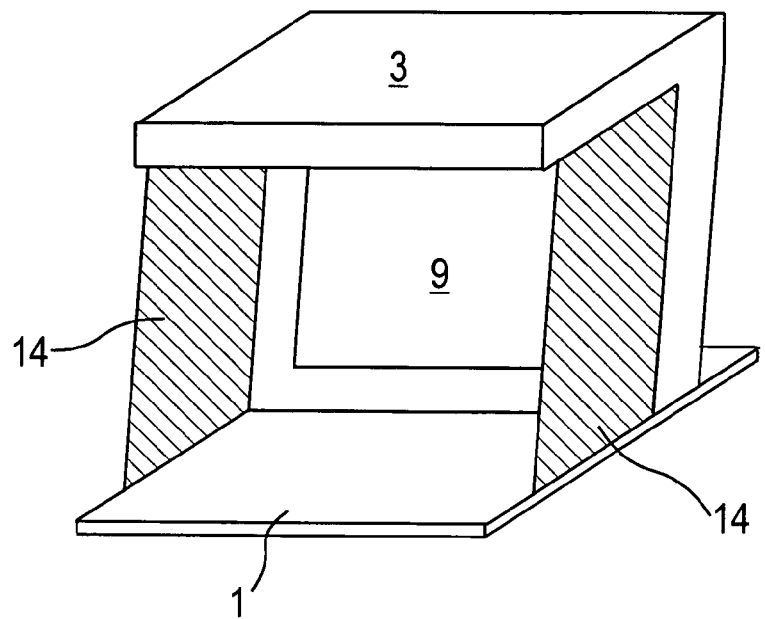
FIG. 8: Light box with a horizontal roller in its closed state

FIG. 8 shows another embodiment form chosen as an example of the invention-specific light box. Here the side walls for the most part consist of a screen 14 made of an opaque material. To close the light box, the rollers 14 are pulled forward and thus replace the side walls. In this version, the rollers 14 are opened and closed in a horizontal direction. However, a version of a light box with vertically drawn rollers is also possible.

Figure 9:
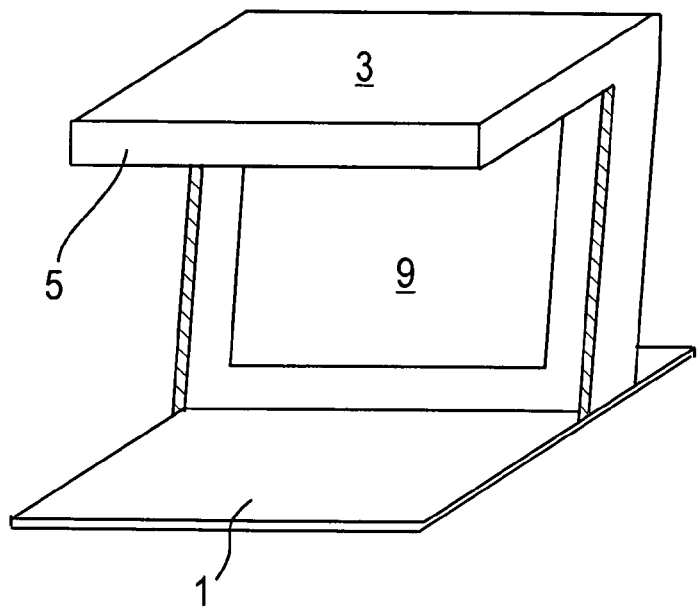
FIG. 9: Light box with a horizontal roller in its open state

If the rollers 14 are rolled up behind the monitor 9, i.e., if the light box is, so to speak, open, the shade 5 and the upper part 3 stay still. This is shown in FIG. 9. Now the visual field is no longer laterally limited. In fact the shade 5 and the upper part 3 still remain in the visible area in front of monitor 9. Together with the rear wall and the base plate 1 they form a secure housing. What is also disadvantageous in this version is that the light source placed behind shade 5 continues to irradiate monitor 9 in its open state. Thus it can only be switched off while allowing for longer waiting times, and thus a less flexible utilization of the work station.

Figure 10:
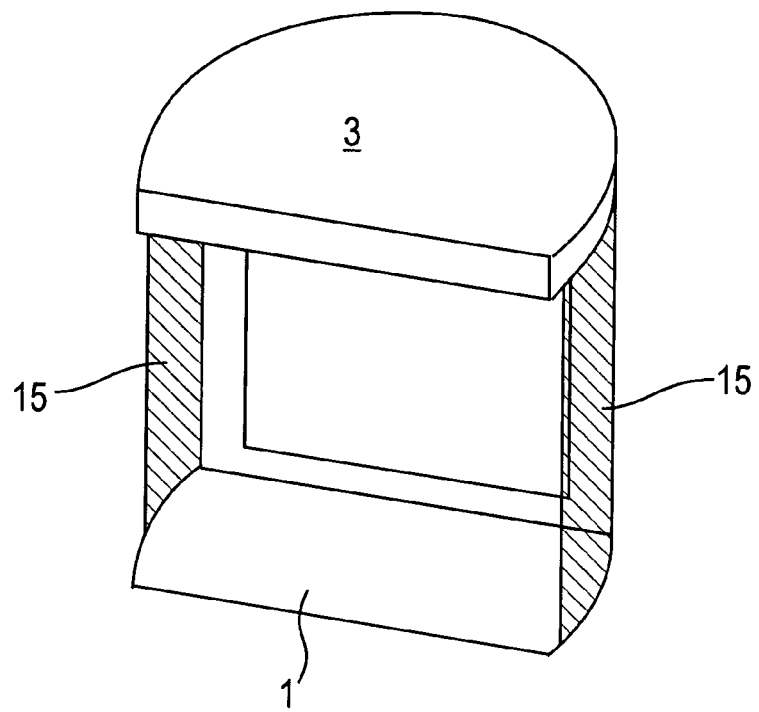
FIG. 10: C-shaped light box in its closed state
Figure 11:
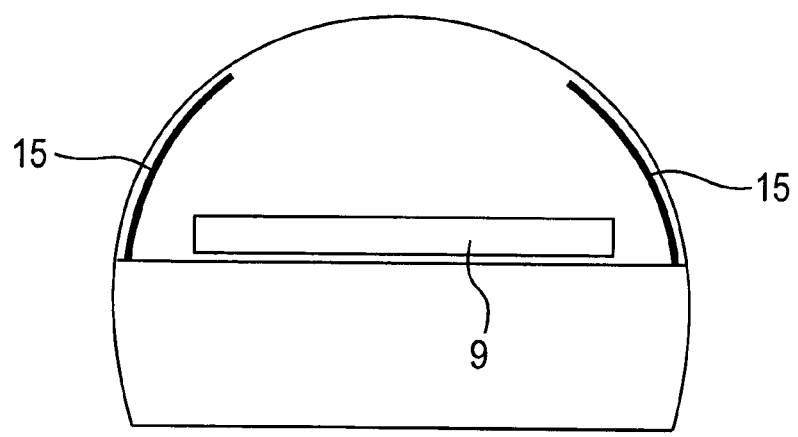
FIG. 11: C-shaped light box in its open state

Another embodiment form of an invention-specific light box is a C-shaped configuration. Here in horizontal cross section the light box has a C arch shape, as shown in FIG. 10. The base plate 1 and the upper part 3 are arch-shaped with a flattened front side. The side walls 15 and the rear wall are likewise arclike in design. In a closed state, the visual field is severely limited by the side walls that extend far forward. To open the light box, the front areas of the arc-shaped side walls 15 telescope into the interior of the light box behind the monitor, as is shown in the horizontal cross section in FIG. 11.

The shade, the upper part and the light source remain over or in front of the monitor 9, so that the visual field is not completely open and the monitor 9 continues to be irradiated. If desired this can be prevented by pulling a shade beneath the lamps in front of these.

Understandably, the features named above of the invention can be used not merely in the particular combination indicated, but rather in other combinations as well or singly, without departing from the scope of the invention.

LIST OF REFERENCE SYMBOLS

1 Base plate
2 Side wall
2.1 Front part of a side wall
2.2 Rear part of a side wall
3 Upper part
3.1 Front part of the upper part
3.2 Rear part of the upper part
4 Rear wall
5 Shade
6 Rail
7 Fluorescent tube
8 Fan
9 Monitor
9.1 Monitor frame
9.2 light-proof seal
10 Switch
11 Turning device
12 Spacer
13 Air slot
14 Roller
15 arc-shaped side walls
16 Inner shade
17 Monitor shade

We claim:

1. A device for creating defined lighting conditions at a monitor surface, said device comprising: a base plate for supporting a monitor, light screening elements configured to surround in part a monitor on said base plate, said screening elements including side walls on each side comprised of at least two members, slidably mounted on said base plate, configured to slide backwards into each other, an upper portion including at least two separate members configured to slide backwards into each other, wherein the upper portion and side walls are integral with one another, and form in concert with the base plate an adjustable light-proof surround when viewed from the top, sides and bottom, having a C-shaped cross-section, a shade partially extending down from a front-most member of the upper portion, a rear portion placed behind the monitor surface for preventing light from impinging backwards, and additionally, at least one light source for illuminating the monitor surface, configured such that the screening elements can be slid backwards so that the screening effect is maximized or minimized according to user preference, wherein the light source is configured such that it does not illuminate the monitor surface when the screening elements are retracted.

2. The device according to claim 1, wherein the rear portion for preventing light from impinging backwards is a real wall.

3. The device according to claim 2, wherein the rear portion for preventing light from impinging backwards includes a light-proof seal between a monitor or a monitor frame and surrounding screening elements.

4. The device according to claim 1, wherein the side walls and the upper portion are configured in two parts with a front part and a rear part wherein the front parts are slidably mounted on the base plate.

5. The device according to claim 1, wherein the side walls are equipped with rails along the base plate, assisting the members to slide.

6. The device according to claim 1, wherein the side walls are equipped with rollers along the base plate, assisting the members to slide.

7. The device according to claim 6, wherein the rollers are configured horizontal.

8. The device according to claim 6, wherein the rollers are configured vertical.

9. The device according to claim 1, wherein the side walls and upper portion are configured to be foldable.

10. The device according to claim 1, further comprising at least one ventilation device.

11. The device according to claim 10, wherein the ventilation device is an electrically-powered fan.

12. The device according to claim 11, further comprising a switch for operation of the electrically-powered fan is included.

13. The device according to claim 10, further comprising a light trap for the ventilation device.

14. The device according to claim 1, further comprising a switch for operation of the at least one light source.

15. The device according to claim 1, further comprising at least one locking device for moving parts.

16. The device according to claim 1, further comprising an electrically powered drive system for movement of portions at least in part of said moveable members.

17. The device according to claim 1, wherein the inner side of the screening elements and the base plate are at least partially provided with light-absorbing surfaces.

18. The device according to claim 1, wherein the at least one light source is equipped with an adjustable shade, and optionally with filters of different colors.

* * * * *